(12) United States Patent
Zhao et al.

(10) Patent No.: US 12,376,038 B2
(45) Date of Patent: Jul. 29, 2025

(54) TERMINAL, COMMUNICATION SYSTEM, COMMUNICATION METHOD AND STORAGE MEDIUM

(71) Applicant: BOE Technology Group Co., Ltd., Beijing (CN)

(72) Inventors: Kai Zhao, Beijing (CN); Lingfeng Xu, Beijing (CN); Hongtao Guan, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 952 days.

(21) Appl. No.: 17/605,541

(22) PCT Filed: Feb. 22, 2021

(86) PCT No.: PCT/CN2021/077288
§ 371 (c)(1),
(2) Date: Oct. 21, 2021

(87) PCT Pub. No.: WO2021/169923
PCT Pub. Date: Sep. 2, 2021

(65) Prior Publication Data
US 2022/0264467 A1 Aug. 18, 2022

(30) Foreign Application Priority Data
Feb. 26, 2020 (CN) .......................... 202010118210.6

(51) Int. Cl.
*H04W 52/02* (2009.01)
(52) U.S. Cl.
CPC ... *H04W 52/0238* (2013.01); *H04W 52/0235* (2013.01); *H04W 52/0274* (2013.01)

(58) Field of Classification Search
CPC ......... H04W 52/0238; H04W 52/0235; H04W 52/0274; H04W 52/0261; Y02D 30/70
See application file for complete search history.

(56) References Cited

U.S. PATENT DOCUMENTS

| 7,865,506 B1 * | 1/2011 | Pedersen ........... H04M 1/72445 |
| | | 707/726 |
| 10,178,016 B1 | 1/2019 | Hall et al. |
| 2006/0248208 A1 * | 11/2006 | Walbeck ................... H04L 9/40 |
| | | 709/230 |
| 2011/0222407 A1 * | 9/2011 | Matsuo ................. H04L 41/145 |
| | | 370/241 |

(Continued)

FOREIGN PATENT DOCUMENTS

| CN | 101087220 A | 12/2007 |
| CN | 104219743 A | 12/2014 |

(Continued)

OTHER PUBLICATIONS

CN202010118210.6 first office action.

*Primary Examiner* — Fred A Casca
(74) *Attorney, Agent, or Firm* — IPro, PLLC

(57) ABSTRACT

Provided is a terminal including a receiver and a processor. The receiver is configured to output a trigger signal in response to receiving a destination address in a data packet; and the processor is configured to, in response to detecting the trigger signal, control the receiver to stop receiving the data packet, in the case that the destination address is not an address of the terminal.

14 Claims, 3 Drawing Sheets

(56) References Cited

U.S. PATENT DOCUMENTS

2014/0137210 A1* 5/2014 Kountouris ......... H04W 12/126
                                                            726/4
2018/0132182 A1* 5/2018 Hanley ............. H04W 52/0235

FOREIGN PATENT DOCUMENTS

| CN | 105472718 A | 4/2016 |
| CN | 108932829 A | 12/2018 |
| CN | 109511158 A | 3/2019 |
| CN | 110958676 A | 4/2020 |
| CN | 111294906 A | 6/2020 |

* cited by examiner

TERMINAL, COMMUNICATION SYSTEM, COMMUNICATION METHOD AND STORAGE MEDIUM

CROSS REFERENCE TO RELATED APPLICATION

This application is a US national stage of international application No. PCT/CN2021/077288, filed on Feb. 22, 2021, which claims priority to Chinese Patent Application No. 202010118210.6, filed on Feb. 26, 2020 and entitled "TERMINAL, COMMUNICATION SYSTEM AND COMMUNICATION METHOD," the disclosures of which are incorporated herein by reference in their entireties.

TECHNICAL FIELD

The present disclosure relates to a terminal, a communication system, a communication method and a storage medium.

BACKGROUND

Many wireless communication systems have a requirement of energy saving. In particular, how to effectively save energy for a terminal, which is powered by a battery in a wireless communication system, attracts intensive attention.

SUMMARY

The present disclosure provides a terminal, a communication system, a communication method and a storage medium.

According to an aspect of the present disclosure, a terminal is provided. The terminal includes: a receiver and a processor, wherein
 the receiver is configured to output a trigger signal in response to receiving a destination address in a data packet; and
 the processor is configured to, in response to detecting the trigger signal, control the receiver to stop receiving the data packet, in the case that the destination address is not an address of the terminal.

Optionally, the processor is configured to control the terminal to enter a sleep state, in the case that the destination address is not the address of the terminal.

Optionally, the processor is further configured to control the receiver to continue receiving the data packet, in the case that the destination address is the address of the terminal.

Optionally, the receiver is further configured to enter the sleep state in response to completion of receiving the data packet.

Optionally, the receiver is configured to determine that the destination address is received, in the case that a total quantity of bytes of data in the data packet received is equal to a reference quantity threshold.

Optionally, the receiver is configured to store the destination address in a first-in first-out fashion; and
 the processor is configured to read the destination address from the receiver in the first-in first-out fashion.

Optionally, the receiver is further configured to perform channel activity detection in the case that the sleep state lasts for a reference duration; and in response to detecting a preamble, receive other data in a data packet which carries the preamble, and activate the processor in the sleep state.

Optionally, the receiver is further configured to continue the sleep state in response to not detecting the preamble.

Optionally, the data packet includes a preamble, the destination address, and data content, wherein the preamble, the destination address, and the data content are sequentially defined.

According to another aspect of the present disclosure, a communication system is provided. The communication system includes a server, a gateway, and at least one terminal according to the present disclosure. The server is configured to transmit a data packet to the terminal by the gateway.

According to another aspect of the present disclosure, a communication method is provided. The communication method includes:
 outputting a trigger signal by a receiver of a terminal in response to receiving a destination address in a data packet; and
 in response to detecting the trigger signal by the processor of the terminal, controlling the receiver to stop receiving the data packet, in the case that the destination address is not an address of the terminal.

Optionally, controlling the receiver to stop receiving the data packet, in the case that the destination address is not the address of the terminal includes: controlling the terminal to enter a sleep state, in the case that the destination address is not the address of the terminal.

Optionally, the method further includes: controlling the receiver by the processor to continue receiving the data packet, in the case that the destination address is the address of the terminal.

Optionally, the method further includes: in response to completion of receiving the data packet by the receiver, the receiver changing to the sleep state.

Optionally, the method further includes: determining that the destination address is received by the receiver, in the case that a total quantity of bytes of data in the data packet received is equal to a reference quantity threshold.

Optionally, the method further includes: storing data received in a first-in first-out fashion by the receiver, and reading the destination address by the processor from the receiver in the first-in first-out fashion.

Optionally, the method further includes: performing channel activity detection by the receiver in the case that the sleep state lasts for a reference duration; and in response to detecting a preamble, receiving other data in a data packet which carries the preamble, and activating the processor in the sleep state.

Optionally, the method further includes: in response to not detecting the preamble, the receiver continuing the sleep state.

Optionally, the data packet includes a preamble, the destination address, and data content, wherein the preamble, the destination address, and the data content are sequentially defined.

BRIEF DESCRIPTION OF THE DRAWINGS

For clearer illustration of the technical solutions in the embodiments of the present disclosure, accompanying drawings required for describing the embodiments are briefly introduced hereinafter. Apparently, the accompanying drawings described hereinafter merely illustrate some embodiments of the present disclosure, and a person of ordinary skill in the art may derive other drawings from these accompanying drawings without creative efforts.

The embodiments of the present disclosure are described in detail with reference to the accompany drawings.

DETAILED DESCRIPTION

Figure 1:
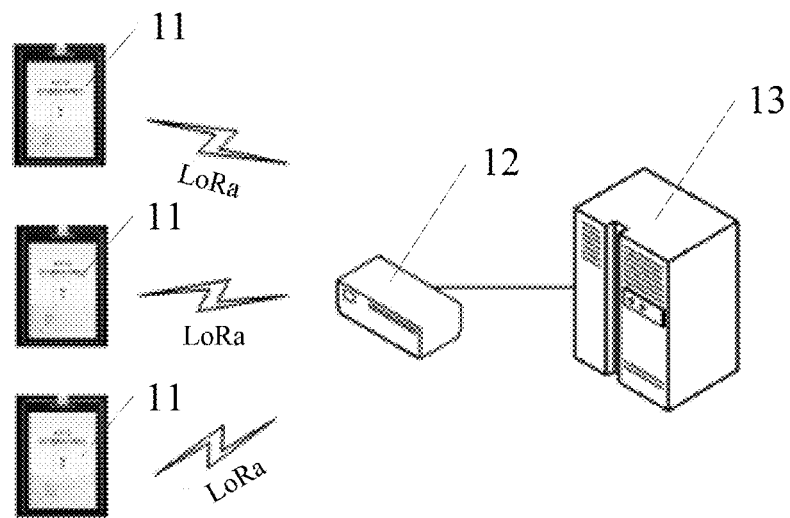
FIG. 1 shows a framework of a communication system according to an embodiment of the present disclosure.

For clearer description of the present disclosure, embodiments of the present disclosure are described in detail hereinafter with reference to the accompany drawings. The same reference signs in the accompany drawings indicate similar elements. Those skilled in the art should understand that the content described hereinafter is illustrative rather than restrictive, and shall not be understood as a limitation to the protection scope of the present disclosure.

Many wireless communication systems have a requirement of energy saving. In particular, how to effectively save energy for a terminal, which is powered by a battery in a wireless communication system, attracts intensive attention. A long range (LoRa) technology-based wireless communication system is taken as an example.

As a long-distance wireless transmission technology based on spread spectrum technology, LoRa is one of many low power wide area network (LPWAN) communication technologies. LoRa is first adopted and promoted by a US company Semtech to provide users a wireless communication means to achieve long-distance and low-power transmission. At present, LoRa mainly operates in the industrial, scientific and medical (ISM) frequency bands, and mainly includes 433 MHz, 868 MHz, 915 MHz, and the like.

The advantage of LoRa lies in the capability of effectively ensuring stability, anti-interference and long-distance communication capacity of the communication system with a spread spectrum technology. A single gateway or base station may cover an entire city or hundreds of square kilometers. In a given location, the distance highly depends on the environment or obstacles. However, in the case that the data is transmitted with the spread spectrum technology, each byte that shall be transmitted may be transmitted many times. Thus, in the case that the data is transmitted with the spread spectrum technology, the time spent for transmitting per unit of data may be an exponential multiple of 2 of that in the common wireless transmission method. Due to the extension of the transmission time, the power consumption consumed by per unit of data may be increased significantly at both the receiver and the transmitter.

In addition, a water meter data acquisition method based on LoRa low-power wireless communication technology may be adopted to reduce power consumption of the devices based on LoRa technology. According to this method, a water meter terminal based on LoRa technology actively reports data to the server, and in the case that the water meter terminal does not report data, the wireless is turned off to reduce power consumption. Obviously, this method for reducing power consumption is only suitable for one-way data transmission from terminal to the server in a low frequency. For application scenarios with frequent bidirectional data interaction, it is difficult to reduce the power consumption of the terminal device under a premise of ensuring that the terminal receives data timely and performs interaction effectively and timely.

The embodiments of the present disclosure provide a terminal, a communication system, a communication method, and a storage medium. By outputting a trigger signal by a receiver of a terminal in response to receiving a destination address in a data packet, a processor detects the trigger signal. In response to determining that the destination address is not an address of the terminal, the processor controls the receiver to stop receiving the data packet. The processor can control the terminal to stop receiving the data packet in response to determining that the data packet is not a data packet to be transmitted to the terminal. Therefore, power consumption waste due to continuously receiving invalid data can be avoided, and power consumption of the terminal is effectively reduced.

FIG. 1 shows a schematic structural diagram of a communication system according to an embodiment of the present disclosure. As shown in FIG. 1, the communication system includes a server 13, a gateway 12 and at least one terminal 11. The server is configured to transmit data information to the terminal by the gateway, and the data information is transmitted in the form of a data packet.

The terminal 11 is configured to receive data in a wireless communication fashion. Optionally, the terminal 11 is further configured to transmit data to the server 13 in a wireless communication fashion.

The gateway 12 is configured to relay the data transmitted by the server 13 to the terminal 11 and the data transmitted by the terminal 11 to the server. That is, in the case that the server transmits data to the terminal, the data is transmitted to the gateway and then transmitted to the terminal by the gateway. In the case that the terminal 11 transmits data to the server, the data is transmitted to the gateway and then forwarded to the server by the gateway.

The server 13 is configured to transmit data to the terminal 11. Optionally, the server 13 is further configured to receive and analyze the data transmitted by the terminal 11. In addition, the server 13 is further configured to control behaviors of the gateway 12 and the terminal 11.

Figure 2:
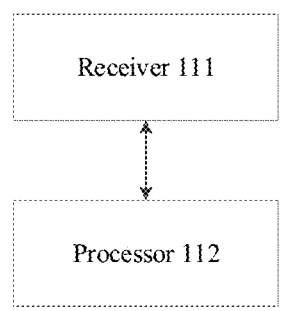
FIG. 2 is a structural block diagram of a terminal according to an embodiment of the present disclosure.

As shown in FIG. 2, the terminal 11 includes a receiver 111 and a processor 112. The receiver is at least configured to receive data. Optionally, the receiver may further transmit data, and is also referred to as a transceiver in this case. Operation of the terminal is described in detail in the following embodiments.

Optionally, the terminal may be powered by a battery or the like, and execute the communication in a wireless communication fashion. For example, the terminal may be powered by a battery and may be an Internet of Things terminal, and the terminal may be a badge or cargo tag based on LoRa communication. Accordingly, the communication system may be applied to scenarios requiring data interaction, such as personnel management and warehouse logistics management. FIG. 1 is a schematic diagram of communication between the terminal 11 and the gateway 12 by the Lora technology.

Figure 3:
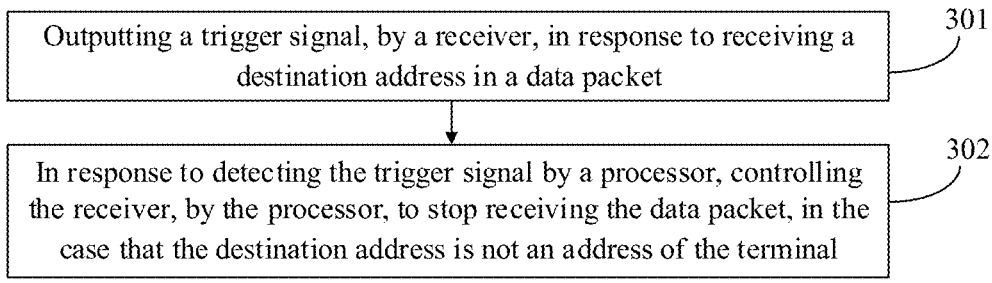
FIG. 3 is a flowchart of a communication method according to an embodiment of the present disclosure.

For ease of understanding of the present disclosure, the implementation process of the communication method according to the embodiments of the present disclosure is described. FIG. 3 is a flowchart of a communication method according to an embodiment of the present disclosure. As shown in FIG. 3, the communication method includes the following processes.

In 301, a receiver outputs a trigger signal in response to receiving a destination address in a data packet.

In 302, in response to detecting the trigger signal by a processor, the processor controls the receiver to stop receiving the data packet, in the case that the destination address is not an address of the terminal.

It can be seen from the above that by outputting a trigger signal by a receiver of a terminal in response to receiving a destination address in a data packet, a processor detects the trigger signal. In response to determining that the destination address is not an address of the terminal, the processor controls the receiver to stop receiving the data packet. The processor can control the terminal to stop receiving the data packet in response to determining that the data packet is not a data packet to be transmitted to the terminal. Therefore, power consumption waste due to continuously receiving invalid data can be avoided, and power consumption of the terminal is effectively reduced.

Figure 4:
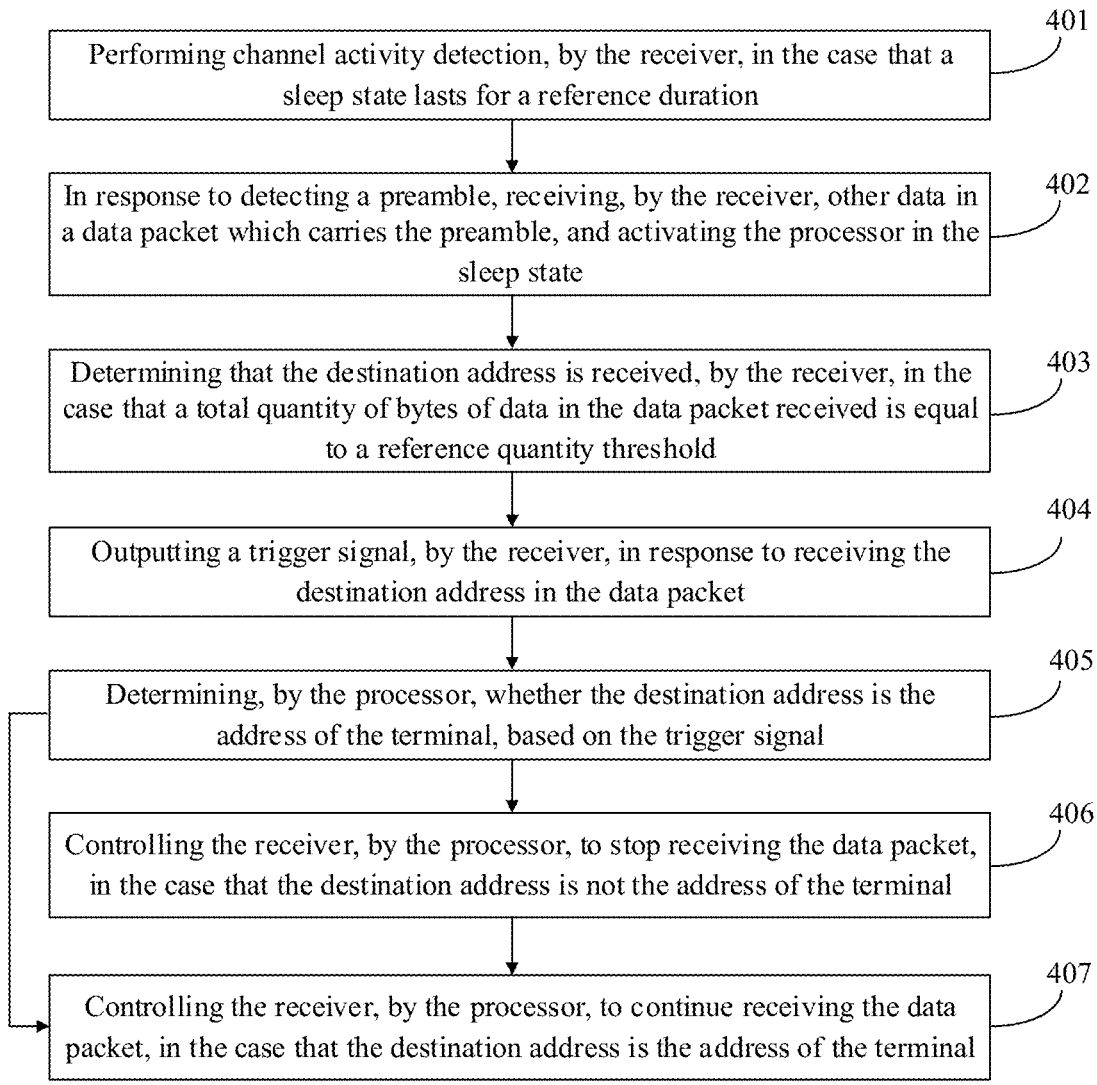
FIG. 4 is a flowchart of another communication method according to an embodiment of the present disclosure.

FIG. 4 is a flowchart of another communication method according to an embodiment of the present disclosure. As shown in FIG. 4, the communication method includes following processes.

In 401, the receiver performs channel activity detection (CAD) in the case that a sleep state lasts for a reference duration.

To reduce power consumption of the terminal, the terminal or the receiver can enter a sleep state in the case that there is no need to process data. For example, the terminal can operate in a periodically sleep state. In addition, to perform effective data interaction, the terminal performs the CAD in the case that the sleep state lasts for a reference duration, so as to determine whether the gateway transmits data to the terminal. For example, the CAD can be performed by quickly scanning whether a preamble transmitted in the air under a frequency band to detect whether there is a data packet to be received. The reference duration can be determined based on application requirements, for example, the reference duration is 500 milliseconds. The receiver in the sleep state indicates that the receiver does not need to operate.

In the case that the receiver detects the preamble by the CAD, it is determined that a gateway transmits data to the terminal, and step 402 is performed. In the case that no preamble is detected, it is determined that no gateway transmits data to the terminal, and the terminal continues the sleep state.

The terminal in the sleep state can indicate that an overall of the terminal is in the sleep state, or the receiver of the terminal is in the sleep state. In addition, whether the overall of the terminal or the receiver to enter the sleep state can be controlled based on application requirements, which is not limited in the embodiments of the present disclosure.

Optionally, the receiver is a radio frequency chip in the terminal. For example, the receiver is an SX1278 radio frequency chip.

In 402, the receiver, in response to detecting a preamble, receives other data in a data packet which carries the preamble, and activates the processor in the sleep state.

In the case that the preamble is detected, it indicates that a gateway transmits data to the terminal. The receiver can receive other data in the data packet which carries the preamble based on the preamble, and activate the processor in the sleep state, such that the processor can process the other data received. The preamble is configured to remind the terminal that what is about to be transmitted is a valid data packet, and the terminal need to receive the data packet to prevent losing useful signals.

The data packet generally includes content of various parts, and other data in the data packet is content of the data packet except for the preamble. For example, the data packet includes the preamble, the destination address, and data content, wherein the preamble, the destination address, and data content are sequentially defined, and thus, the other data includes the destination address and the data content. For another example, the data packet includes the preamble, the destination address, a source address, data content, and check code, wherein the preamble, the destination address, the source address, the data content, and the check code are sequentially defined, and thus, the other data includes the destination address, the source address, the data content, and the check code. It should be noted that, during transmission of the data packet, respective parts of the data packet are sequentially transmitted based on the defining way of the data packet.

In some embodiments, the receiver is the SX1278 radio frequency chip, and the processor is a microcontroller unit (MCU). The SX1278 radio frequency chip has 6 DIO pins in total for feeding back an internal state of the SX1278 radio frequency chip, and each pin can map a different function. For example, in response to detecting the preamble, the SX1278 radio frequency chip may feed back to the MCU via the DIO4 pin that the preamble is detected, to activate the MCU.

In 403, the receiver determines that the destination address is received, in the case that a total quantity of bytes of data in the data packet received is equal to a reference quantity threshold.

In some embodiments, the receiver can determine whether the destination address is received based on the total quantity of bytes of the received data. The destination address herein may be an Internet Protocol (IP) address.

Optionally, the reference quantity threshold may be determined based on a length of the destination address in the data packet. In some embodiments, the receiver, in response to receiving other data in the data packet, stores the other data in a storage area of the receiver. Therefore, the reference quantity threshold may be determined to be equal to the length of the destination address in the data packet. That is, in the case that a length of data in the storage area of the receiver is equal to the length of the destination address, it is determined that the destination address has been received.

For example, Table 1 is a format of a data packet according to an embodiment of the present disclosure. As shown in Table 1, in the data packet, a length of the preamble is A bytes; a length of the destination address is N bytes; a length of the source address is M bytes; a length of the data content is B bytes, and a length of the check bit of a cyclic redundancy check (CRC) code is C bytes (such as 2 bytes). Thus, the reference quantity threshold can be determined to be N.

TABLE 1

| Preamble | Destination address | Source address | Data content | Check bit |
|---|---|---|---|---|
| A bytes | N bytes | M bytes | B bytes | C bytes |

In 404, the receiver, in response to receiving the destination address in the data packet, outputs a trigger signal.

The receiver, in response to receiving the destination address, can output a trigger signal to instruct the processor to perform determination based on the destination address. Optionally, the receiver and the processor can interact with each other via an interrupt signal, and the trigger signal is an interrupt signal.

The storage area herein is a first-in first-out (FIFO) storage area. In response to receiving the data packet, the SX1278 radio frequency chip demodulates the received data in a unit of byte, and sequentially written into the FIFO storage area. The DIO1 pin of the SX1278 radio frequency chip can map a state of the FIFO storage area, which indicates whether the FIFO storage area is empty or full, or indicates that the data filled in the FIFO storage area exceeds the reference quantity threshold (referred to as FIFO Level). The process of indicating that the data filled in the FIFO storage area exceeds the reference quantity threshold by the DIO1 pin includes: in the case that the receiver is in a receiving state and the total quantity of bytes of data as written into the FIFO storage area is equal to the reference quantity threshold, the DIO1 pin is pulled up from a low level to a high level. By taking the DIO1 pin changing from the low level to the high level as the trigger signal and in conjunction with a configuration of configuring the FIFO level as the length of the destination address being N bytes, it is possible to notify the MCU to complete the reception of the destination address by the level of the DIO1 pin changing from low to high. Thus, the MCU can determine timely, based on the destination address, whether the destination address is the address of the terminal where the MCU is disposed, to avoid the waste of terminal power consumption caused by the complete reception of invalid data packets. It should be noted that although a packet header in the data packet structure shown in Table 1 is the preamble of A bytes, the received data packet may be understood as starting from the destination address, and the preamble is only configured to perform CAD detection by the SX1278 radio frequency chip.

In 405, the processor determines, based on the trigger signal, whether the destination address is the address of the terminal.

The processor, in response to receiving the trigger signal, can determine, with an instruction of the trigger signal, whether the destination address is the address of the terminal where the processor is disposed. Step 406 is performed in the case that the destination address is not the address of the terminal where the processor is disposed; and step 407 is performed in the case that the destination address is the address of the terminal where the processor is disposed.

Optionally, the processor stores the address of the terminal where the processor is disposed. The processor, in response to receiving the trigger signal, can read the destination address from the storage area of the receiver, read the address of the terminal where the processor is disposed from the processor, and compare the destination address with the address of the terminal to determine whether the destination address is the address of the terminal.

In some embodiments, the storage area of the receiver stores the data received in a first-in first-out fashion. Accordingly, the processor reads the destination address from the receiver in a first-in first-out fashion.

Since the receiver stores other data in the data packet except the preamble in the storage area, the data firstly stored in the storage area is the destination address. By reading the destination address from the receiver in the first-in first-out fashion, the destination address can be acquired quickly and the time spent for determining whether the destination address is the address of the terminal is shorten, such that the terminal receives less data during the determination process, thereby reducing the power consumption of the terminal.

In 406, the processor controls the receiver to stop receiving the data packet, in the case that the destination address is not the address of the terminal.

In the case that the destination address is not the address of the terminal, the data packet is not a data packet to be transmitted to the terminal, and the processor controls the receiver to stop receiving the data packet. Thus, the terminal is enabled to stop receiving the data packet. Power consumption waste due to continuously receiving invalid data can be avoided, and power consumption of the terminal is effectively reduced.

In some embodiments, in the case that the destination address is not the address of the terminal, the processor controls the terminal or the receiver to enter a sleep state, such that the receiver stops receiving the data packet. In this way, the terminal can be controlled to enter the sleep state timely in response to determining that the data packet is not transmitted to the terminal, such that the terminal is no longer in the active state for receiving the invalid data information, thereby more thoroughly preventing the waste of power consumption caused by the complete reception of invalid data information.

Alternatively, in the case that the destination address is not the address of the terminal, the processor transmits an instruction signal to the receiver to instruct the receiver to stop receiving the data packet. Correspondingly, the receiver, in response to receiving the instruction signal, stops receiving the data packet based on the instruction signal.

Optionally, the processor clears the storage area of the receiver while controlling the receiver to stop receiving the data packet, to store the data received next time in the storage area.

In 407, the processor controls the receiver to continue receiving the data packet, in the case that the destination address is the address of the terminal.

In the case that the destination address is the address of the terminal, the data packet is a data packet that needs to be transmitted to the terminal. Thus, the processor controls the receiver to continue receiving the data packet, such as the source address, data content, and CRC check bit. In some embodiments, in the case that the destination address is the address of the terminal, the processor transmits an instruction signal to the receiver to instruct the receiver to continue receiving the data packet. Alternatively, since the receiver keeps receiving data when the processor is determining whether the destination address is the terminal address, the processor may not transmit the instruction signal to the receiver in the case that the destination address is the address of the terminal, such that the receiver remains in the receiving state.

Furthermore, the receiver can enter the sleep state in response to completion of receiving the data packet, to reduce the power consumption of the terminal. For example, the data packet further includes a terminator. In response to receiving the terminator, the receiver can determine that the data packet has been received completely, and then acquire the check bit of the first C bytes of the terminator to perform CRC check based on the check bit. In response to determining that the check is successful, the determination that the CRC check is correct based on the CRC check bit is fed back via the DIO0 pin, to indicate that a complete data packet has been received, such that the MCU is notified to read the complete data packet in the FIFO storage area to analyze the data in the data packet. Then, the SX1278 radio frequency chip can return to the sleep state and continue the dormancy for the reference duration. In addition, the MCU may also enter the sleep state in response to completion of the data analysis.

It should be noted that the maximum storage data length of the FIFO storage area of the SX1278 radio frequency chip in a frequency shift keying (FSK) radio frequency modulation mode is 64 bytes. Therefore, in the case that the length of the data packet that needs to be transmitted to the terminal exceeds 64 bytes, the data packet to be transmitted should be unpacked, such that the length of each data packet transmitted to the terminal does not exceed 64 bytes, thereby ensuring effective reception of the data.

It is understandable that in the communication system according to the embodiment of the present disclosure, the gateway 12 can also perform the communication method according to the embodiment of the present disclosure during the process of receiving the data packet that needs to be transmitted by the terminal 11 to the server 13, to reduce the power consumption of the gateway 12. For example, a data channel of the gateway 12 (a data channel corresponds to a transceiver of the gateway 12, and the gateway 12 may be provided with a plurality of data channels) may receive the data packet in response to detecting the preamble. Then, the gateway 12, in response to receiving the destination address in the data packet, can determine whether the data packet needs to be transmitted to the gateway, based on the destination address. In the case that the data packet needs to be transmitted to the gateway, the data channel is controlled to continue receiving the data packet; and in the case that the data packet does not need to be transmitted to the gateway, the data channel of the gateway 12 is controlled to enter the sleep state. However, unlike the terminal 11 that is generally powered by a battery and has a high requirement in energy saving and consumption reduction, the gateway 12 is generally powered by stable 220V, and has a stable power supply. Thus, the gateway 12 has a low requirement in energy saving and consumption reduction. Therefore, although the value of power consumption reduction is theoretically similar, the effect of the above power consumption reduction is more significant while being applied to the terminal 11. In addition, when the gateway adopts the above communication method, the load of the gateway can be reduced and the working performance of the gateway can be improved.

In summary, in the communication method according to the embodiments of the present disclosure, by outputting a trigger signal by a receiver of the terminal in response to receiving a destination address in a data packet, a processor determines whether the destination address is an address of the terminal based on the trigger signal. In the case that the destination address is not the address of the terminal, the processor controls the receiver to stop receiving the data packet. The processor can control the terminal to stop receiving the data packet in response to determining that the data packet is not a data packet to be transmitted to the terminal. Therefore, power consumption waste due to continuously receiving invalid data can be avoided, and power consumption of the terminal is effectively reduced. Accordingly, in application scenarios of frequent bidirectional data interaction, data can be received in time, and interaction can be performed effectively and timely while power consumption can be reduced considerably.

In related art, since the SX1278 radio frequency chip does not have a data analyzing function, the data analysis shall be performed by the MCU, which means that the entire receiving process shall still be completed to completely receive the invalid the data packet even if the received data packet is not a data packet to be transmitted to the terminal 11. Then, the MCU makes the analysis and discards the invalid data packet. The average working current of the SX1278 radio frequency chip in the sleep state is approximately 1 uA, and in comparison, the average working current of the SX1278 RF chip in the active state is approximately 20 mA. Thus, a waste of energy consumption obviously occurs in the case that the invalid data packet is completely received. Therefore, the communication method according to the embodiment of the present disclosure can effectively reduce the power consumption of the terminal.

An embodiment of the present disclosure provides a terminal. As shown in FIG. 2, the terminal includes a receiver and a processor.

The receiver is configured to output a trigger signal in response to receiving a destination address in a data packet.

The processor is configured to, in response to detecting the trigger signal, control the receiver to stop receiving the data packet, in the case that the destination address is not an address of the terminal.

By outputting a trigger signal by a receiver of a terminal in response to receiving a destination address in a data packet, a processor detects the trigger signal. In response to determining that the destination address is not the address of the terminal, the processor controls the receiver to stop receiving the data packet. The processor can control the terminal to stop receiving the data packet in response to determining that the data packet is not a data packet to be transmitted to the terminal. Therefore, power consumption waste due to continuously receiving invalid data can be avoided, and power consumption of the terminal is effectively reduced.

In some embodiments, the processor is configured to control the terminal to enter a sleep state, in the case that the destination address is not the address of the terminal.

In some embodiments, the processor is further configured to control the receiver to continue receiving the data packet, in the case that the destination address is the address of the terminal.

In some embodiments, the receiver is further configured to enter the sleep state in response to completion of receiving the data packet.

In some embodiments, the receiver is configured to determine that the destination address is received, in the case that a total quantity of bytes of data in the data packet received is equal to a reference quantity threshold.

In some embodiments, the receiver is configured to store the destination address in a first-in first-out fashion, and the processor is configured to read the destination address from the receiver in the first-in first-out fashion.

In some embodiments, the receiver is further configured to perform channel activity detection in the case that the sleep state lasts for a reference duration; and in response to detecting a preamble, receive other data in a data packet which carries the preamble, and activate the processor in the sleep state.

In some embodiments, the receiver is further configured to continue the sleep state in response to not detecting the preamble.

In some embodiments, the data packet includes a preamble, the destination address, and data content, wherein the preamble, the destination address, and the data content are sequentially defined.

Those skilled in the art can clearly understand that for the ease of description and briefness, specific implementations of the receiver and the processor of the terminal described above can refer to the related content in the above communication method embodiments, which are not repeated herein.

In the terminal according to the embodiments of the present disclosure, by outputting a trigger signal by a receiver of the terminal in response to receiving a destination address in a data packet, a processor determines whether the destination address is the address of the terminal based on the trigger signal. In the case that the destination address is not the address of the terminal, the processor controls the receiver to stop receiving the data packet. The processor can control the terminal to stop receiving the data packet in response to determining that the data packet is not a data packet to be transmitted to the terminal. Therefore, power consumption waste due to continuously receiving invalid data can be avoided, and power consumption of the terminal is effectively reduced. Accordingly, in application scenarios of frequent bidirectional data interaction, data can be received in time, and interaction can be performed effectively and timely while power consumption can be reduced considerably.

Figure 5:
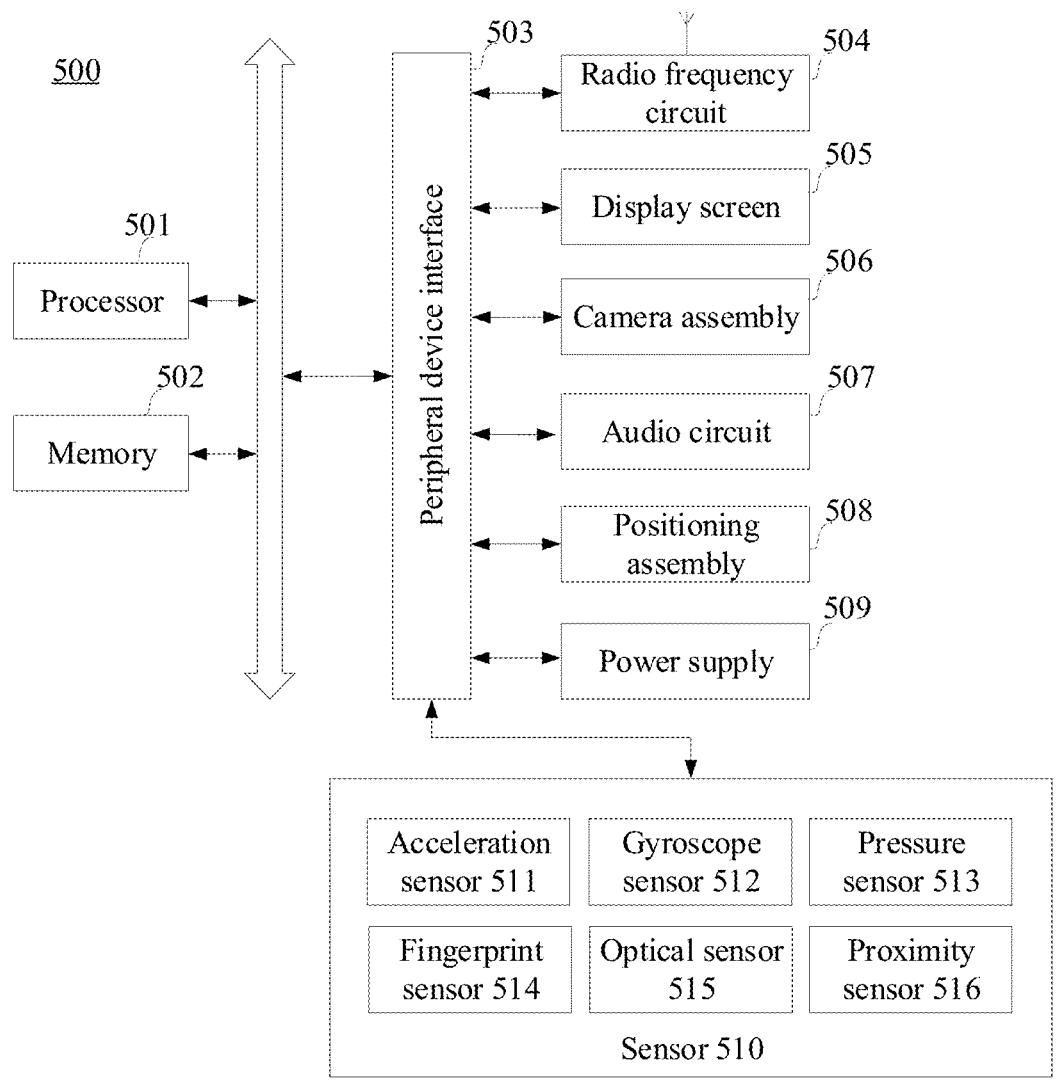
FIG. 5 is a structural block diagram of another terminal according to an embodiment of the present disclosure.

FIG. 5 is a structural block diagram of another terminal 500 according to an embodiment of the present disclosure. The terminal may be an Internet of Things terminal which is powered by a battery and is a badge or goods label communicating by the LoRa technology. Usually, the terminal 500 includes a processor 501 and a memory 502.

The processor 501 may include one or more processing cores, such as a quad-core processor and an eight-core processor. The processor 501 may be implemented in at least one hardware form of a digital signal processing (DSP), a field-programmable gate array (FPGA), and a programmable logic array (PLA). Alternatively, the processor 501 may include a main processor and a coprocessor. The main processor is a processor configured to process data in an awake state, and is also referred to as a central processing unit (CPU). The coprocessor is a low-power-consumption processor configured to process data in a standby state. In some embodiments, the processor 501 may be integrated with a graphics processing unit (GPU). The GPU is configured to render and draw the content that needs to be displayed by a display screen. In some embodiments, the processor 501 may further include an artificial intelligence (AI) processor. The AI processor is configured to process computational operations related to machine learning.

The memory 502 may include one or more computer-readable storage medium, and the computer-readable storage medium can be non-transitory. The memory 502 may further include a high-speed random access memory, and a non-volatile memory, such as one or more magnetic disk storage devices and flash storage devices. In some embodiments, the non-transitory computer-readable storage medium in the memory 502 is configured to store at least one instruction. The at least one instruction is configured to be executed by the processor 501 to perform the communication method according to the method embodiments of the present disclosure.

In some embodiments, the terminal 500 may further optionally include: a peripheral device interface 503 and at least one peripheral device. The processor 501, the memory 502, and the peripheral device interface 503 may be connected by a bus or a signal line. Each peripheral device may be connected to the peripheral device interface 503 by a bus, a signal line or a circuit board. In some embodiments, the peripheral device includes: at least one of a radio frequency circuit 504, a display screen 505, a camera assembly 506, an audio circuit 507, a positioning assembly 508 and a power supply 509.

The peripheral device interface 503 may be configured to connect at least one peripheral device associated with an input/output (I/O) to the processor 501 and the memory 502. In some embodiments, the processor 501, the memory 502 and the peripheral device interface 503 are integrated on the same chip or circuit board. In some other embodiments, any one or two of the processor 501, the memory 502 and the peripheral device interface 503 can be implemented on a separate chip or circuit board, which is not limited in the present embodiment.

The radio frequency circuit 504 is configured to receive and transmit a radio frequency (RF) signal, which is also referred to as an electromagnetic signal. The radio frequency circuit 504 communicates by means of the electromagnetic signal with a communication network and other communication devices. The radio frequency circuit 504 converts the electrical signal to the electromagnetic signal for transmission, or converts the received electromagnetic signal to the electrical signal. Optionally, the radio frequency circuit 504 includes: an antenna system, an RF transceiver, one or more amplifiers, a tuner, an oscillator, a digital signal processor, a coding-decoding chip set, a subscriber identity module card, and the like. The radio frequency circuit 504 can communicate with other terminals via at least one wireless communication protocol. The wireless communication protocol includes, but is not limited to, the World Wide Web, a metropolitan area network, an intranet, various generations of mobile communication networks (2G, 3G, 4G, and 5G), a wireless local area network, and/or a wireless fidelity (Wi-Fi) network. In some embodiments, the RF circuit 504 may further include a circuit related to near-field communication (NFC), which is not limited in the present disclosure.

The display screen 505 is configured to display a user interface (UI). The UI may include a graph, a text, an icon, a video, and any combination thereof. In the case that the display screen 505 is a touch display screen, the display screen 505 further has a function of acquiring a touch signal on or over the surface of the display screen 505. The touch signal may be input to the processor 501 as a control signal for processing. In this case, the display screen 505 may be further configured to provide a virtual button and/or a virtual keyboard, which is also referred to as a soft button and/or a soft keyboard. In some embodiments, the display screen 505 may be provided as one screen disposed on a front panel of the terminal 500. In some other embodiments, the display screen 505 may be provided as at least two screens disposed respectively on different surfaces of the terminal 500 or designed as folded. In other embodiments, the display screen 505 may be a flexible display screen disposed on a curved surface or a folded surface of the terminal 500. Furthermore, the display screen 505 may be provided as a non-rectangular pattern, that is, the display screen 505 may be an irregular-shaped screen. The display screen 505 may be a liquid crystal display (LCD) screen or an organic light-emitting diode (OLED) screen.

The camera assembly 506 is configured to capture an image or a video. Optionally, the camera assembly 506 includes a front camera and a rear camera. Generally, the front camera is disposed on a front panel of the terminal, and the rear camera is disposed on a rear surface of the terminal. In some embodiments, at least two rear cameras are configured, i.e., at least one of a main camera, a depth-of-field camera, a wide-angle camera, and a telephoto camera, to implement a background blur function by combining the main camera and the depth-of-field camera, a panoramic shooting function and a virtual reality (VR) shooting function by combining the main camera and the wide-angle camera, or other fusion shooting functions. In some embodiments, the camera assembly 506 may further include a flashlight. The flashlight may be a single-color-temperature flashlight or a dual-color-temperature flashlight. The dual-color-temperature flashlight is a combination of a warm flashlight and a cold flashlight, and provided light compensation for different color temperatures.

The audio circuit 507 may include a microphone and a speaker. The microphone is configured to acquire sound waves of a user and an environment, convert the sound waves into electrical signals, and input the electrical signals to the processor 501 for processing, or input the electrical signals to the RF circuit 504 to implement voice communication. For the purpose of stereo acquisition or noise reduction, a plurality of microphones may be provided and respectively disposed at different parts of the terminal 500. The microphone may be also an array microphone or an omnidirectional acquisition microphone. The speaker is configured to convert the electrical signals from the processor 501 or the radio frequency circuit 504 into sound waves. The speaker may be a conventional film speaker or a piezoelectric ceramic speaker. In the case that the speaker is the piezoelectric ceramic speaker, the electrical signal can be converted into not only human-audible sound waves, but also the sound waves that are inaudible to humans for the purpose of ranging and the like. In some embodiments, the audio circuit 507 may further include a headphone jack.

The positioning assembly 508 is configured to determine a current geographic location of the terminal 500 to implement navigation or location based service (LBS). The positioning assembly 508 may be the United States' Global Positioning System (GPS), China's BeiDou Navigation Satellite System (BDS), Russia's Global Navigation Satellite System (GLONASS), and the European Union's Galileo Satellite Navigation System (Galileo).

The power supply 509 is configured to supply power for various assemblies in the terminal 500. The power supply 509 may be alternating current, direct current, a disposable battery, or a rechargeable battery. In the case that the power supply 509 includes the rechargeable battery, the rechargeable battery may a wired rechargeable battery or a wireless rechargeable battery. The wired rechargeable battery is a battery charged by a cable line, and the wireless rechargeable battery is charged by a wireless coil. The rechargeable battery may also support the fast-charging technology.

In some embodiments, the terminal 500 also includes one or more sensors 510. The one or more sensors 510 include, but are not limited to, an acceleration sensor 511, a gyroscope sensor 512, a pressure sensor 513, a fingerprint sensor 514, an optical sensor 515 and a proximity sensor 516.

The acceleration sensor 511 may be configured to detect magnitude of accelerations on three coordinate axes of a coordinate system established by the terminal 500. For example, the acceleration sensor 511 may be configured to detect components of gravitational acceleration on the three coordinate axes. The processor 501 may control the display screen 505 to display a user interface in a lateral view or a vertical view based on a gravitational acceleration signals acquired by the acceleration sensor 511. The acceleration sensor 511 may be further configured to acquire motion data of a game or a user.

The gyroscope sensor 512 is configured to detect a body direction and a rotational angle of the terminal 500. The gyroscope sensor 512 may cooperate with the acceleration sensor 511 to acquire a 3D action of the user on the terminal 500. Based on the data acquired by the gyroscope sensor 512, the processor 501 can implement the following functions: motion sensing (such as changing the UI based on a user's tilt operation), image stabilization during shooting, game control and inertial navigation.

The pressure sensor 513 may be disposed on a side frame of the terminal 500 and/or a layer under the display screen 505. In the case that the pressure sensor 513 is disposed on the side frame of the terminal 500, a user's holding signal to the terminal 500 can be detected. The processor 501 can perform left/right hand recognition or a quick operation based on the holding signal acquired by the pressure sensor 513. In the case that the pressure sensor 513 is disposed on the layer under the display screen 505, the processor 501 controls an operable control on the UI based on a user's pressure operation on the display screen 505. The operable control includes at least one of a button control, a scroll bar control, an icon control and a menu control.

The fingerprint sensor 514 is configured to acquire a user's fingerprint. The user's identity is recognized by the processor 501 or by the fingerprint sensor 514 based on the acquired fingerprint by the fingerprint sensor 514. In the case that the user's identity is identified as a trusted identity, the user is authorized by the processor 501 to perform a related sensitive operation, such as unlocking the screen, viewing encrypted information, downloading software, paying, and changing settings. The fingerprint sensor 514 may be disposed on the front, rear, or side surface of the terminal 500. In the case that the terminal 500 is provided with a physical button or its manufacturer's logo, the fingerprint sensor 514 may be integrated with the physical button or the manufacturer's logo.

The optical sensor 515 is configured to acquire intensity of ambient light. In one embodiment, the processor 501 may control the display brightness of the display screen 505 based on the intensity of ambient light acquired by the optical sensor 515. In some embodiments, in the case that the intensity of ambient light is high, the display brightness of the display screen 505 is increased; and in the case that the intensity of ambient light is low, the display brightness of the display screen 505 is decreased. In another embodiment, the processor 501 may be further configured to dynamically adjust imaging parameters of the camera assembly 506 based on the intensity of ambient light acquired by the optical sensor 515.

The proximity sensor 516, also referred to as a distance sensor, is generally disposed on the front panel of the terminal 500. The proximity sensor 516 is configured to acquire a distance between a user and the front surface of the terminal 500. In one embodiment, in the case that the distance between the user and the front surface of the terminal 500 detected by the proximity sensor 516 gradually decreases, the display screen 505 is controlled by the processor 501 to switch from a screen-on state to a screen-off state. In the case that the distance between the user and the front surface of the terminal 500 detected by the proximity sensor 516 gradually increases, the display screen 505 is controlled by the processor 501 to switch from the screen-off state to the screen-on state.

It can be understood by those skilled in the art that the structure shown in FIG. 5 does not constitute a limitation to the terminal 500. More or less components than those illustrated may be included, or some components may be combined, or different component arrangements may be provided.

An embodiment of the present disclosure provides a computer-readable storage medium. The computer-readable storage medium may be a non-volatile storage medium. The computer-readable storage medium stores at least one computer program thereon. The at least one computer program is configured to perform the communication method according to the embodiments of the present disclosure.

Optionally, the computer-readable storage medium may be a computer-readable storage medium included in the terminal of the above embodiments, or a separate computer-readable storage medium that is not installed in the terminal. The computer-readable storage medium may be a system, an apparatus, a device, or any combination of electrical, magnetic, optical, electromagnetic, infrared, or semiconductor. More specific examples of the computer-readable storage medium may include, but are not limited to, an electrical connection with one or more wires, a portable computer disk, a hard disk, a random-access memory (RAM), a read-only memory (ROM), an erasable programmable read-only memory (EPROM or flash memory), an optical fiber, a portable compact disc read-only memory (CD-ROM), an optical storage device, a magnetic storage device, or any combination of the above. In the embodiments of the present disclosure, the computer-readable storage medium may be any tangible medium containing or storing a program, wherein the program can be loaded and executed by an instruction execution system, an apparatus or a device.

The terms "comprise," "include" and any other derivatives in the description of the present disclosure are intended to cover non-exclusive containing, such that a process, a method, an item or a device containing a series of elements not only includes these elements, but also includes other elements that are not set forth specifically, or also includes an inherent element of such a process, method, item or device. Without further limitation, an element defined by a phrase "include a" does not mean that other identical elements are excluded from the process, method, item or device including the same element.

Obviously, the above embodiments of the present disclosure are only for the purpose of clearly illustrating the examples of the present disclosure, not for the limitation of the implementations of the present disclosure. For those of ordinary skill in the art, other changes or modifications in different forms can be made on the basis of the above illustrations. Here, it is impossible to enumerate all the implementations. Any obvious changes or modifications derived from the technical solutions of the present disclosure are still within the protection scope of the present disclosure.

What is claimed is:

1. A terminal, operating in a periodically sleep state, the sleep state meaning that an overall of the terminal is in the sleep state; the terminal comprising a receiver and a processor, wherein
the receiver is configured to perform channel activity detection based on determining that the sleep state lasts for a reference duration; in response to detecting a preamble by the channel activity detection, receive other data in a data packet which carries the preamble, and activate the processor in the sleep state; and based on a total quantity of bytes of data in the data packet received being equal to a reference quantity threshold, determine that a destination address is received, and output a trigger signal, wherein the reference quantity threshold is equal to a length of the destination address in the data packet, and the trigger signal is configured to instruct the processor to perform determination based on the destination address; and
the processor is configured to, based on detecting the trigger signal, control the receiver to stop receiving the data packet and control the terminal to enter the sleep state, based on determining that the destination address is not an address of the terminal;
wherein the receiver is further configured to continue the sleep state in response to not detecting the preamble.

2. The terminal according to claim 1, wherein the processor is configured to control the terminal to enter a sleep state, based on determining that the destination address is not the address of the terminal.

3. The terminal according to claim 1, wherein the processor is further configured to control the receiver to continue receiving the data packet, based on determining that the destination address is the address of the terminal.

4. The terminal according to claim 3, wherein the receiver is further configured to enter a sleep state in response to completion of receiving the data packet.

5. The terminal according to claim 1, wherein the receiver is configured to store the destination address in a first-in first-out fashion, and
the processor is configured to read the destination address from the receiver in the first-in first-out fashion.

6. The terminal according to claim 1, wherein the data packet comprises a preamble, the destination address, and data content, wherein the preamble, the destination address, and the data content are sequentially defined.

7. A communication system, comprising a server, a gateway and at least one terminal as defined in claim 1, wherein the server is configured to transmit a data packet to the terminal via the gateway.

8. A communication method, applicable to a terminal operating in a periodically sleep state, the sleep state meaning that an overall of the terminal is in the sleep state, and the terminal comprising a receiver and a processor;
wherein the method comprises:
performing channel activity detection by the receiver based on determining that the sleep state lasts for a reference duration;
to based on detecting a preamble by the channel activity detection, receiving, by the receiver, other data in a data packet which carries the preamble, and activating, by the receiver, the processor in the sleep state;
determining that a destination address is received and outputting a trigger signal by the receiver of the terminal to based on a total quantity of bytes of data in the data packet received being equal to a reference quantity threshold, wherein the reference quantity threshold is equal to a length of the destination address in the data packet, and the trigger signal is configured to instruct the processor to perform determination based on the destination address;
to based on detecting the trigger signal by the processor of the terminal, controlling the receiver to stop receiving the data packet and controlling the terminal to enter the sleep state, based on determining that the destination address is not an address of the terminal; and
to based on not detecting the preamble, continuing entering the sleep state by the receiver.

9. The communication method according to claim 8, wherein controlling the receiver to stop receiving the data packet, based on determining that the destination address is not the address of the terminal comprises:
controlling the terminal to enter a sleep state, based on determining that the destination address is not the address of the terminal.

10. The communication method according to claim 8, further comprising:
controlling the receiver by the processor to continue receiving the data packet, based on determining that the destination address is the address of the terminal.

11. The communication method according to claim 10, further comprising:

based on completion of receiving the data packet by the receiver, entering a sleep state by the receiver.

12. The communication method according to claim 8, further comprising:
   storing data received in a first-in first-out fashion by the receiver, and
   reading the destination address by the processor from the receiver in the first-in first-out fashion.

13. The communication method according to claim 8, wherein the data packet comprises a preamble, the destination address, and data content, wherein the preamble, the destination address, and the data content are sequentially defined.

14. A non-transitory computer-readable storage medium storing at least one computer program thereon, wherein the at least one computer program, when run by a terminal, causes the terminal to perform:
   performing channel activity detection by a receiver of the terminal based on determining that a sleep state lasts for a reference duration, wherein the terminal operates in a periodically sleep state, the sleep state meaning that an overall of the terminal is in the sleep state, and the terminal comprises the receiver and a processor;
   based on detecting a preamble by the channel activity detection, receiving, by the receiver, other data in a data packet which carries the preamble, and activating, by the receiver, the processor in the sleep state;
   determining that a destination address is received and outputting a trigger signal by the receiver of the terminal to based on a total quantity of bytes of data in the data packet received being equal to a reference quantity threshold, wherein the reference quantity threshold is equal to a length of the destination address in the data packet, and the trigger signal is configured to instruct the processor to perform determination based on the destination address;
   based on detecting the trigger signal by a processor of the terminal, controlling the receiver to stop receiving the data packet and controlling the terminal to enter the sleep state, that based on determining that the destination address is not an address of the terminal; and
   based on not detecting the preamble, continuing entering the sleep state by the receiver.

* * * * *